US012548929B2

(12) United States Patent
Hoshiba et al.

(10) Patent No.: US 12,548,929 B2
(45) Date of Patent: Feb. 10, 2026

(54) CONNECTOR

(71) Applicant: Murata Manufacturing Co., Ltd., Kyoto-fu (JP)

(72) Inventors: Hiroyuki Hoshiba, Nagaokakyo (JP); Yuuto Morita, Nagaokakyo (JP); Yuma Amemori, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 457 days.

(21) Appl. No.: 18/157,658

(22) Filed: Jan. 20, 2023

(65) Prior Publication Data

US 2023/0246358 A1 Aug. 3, 2023

(30) Foreign Application Priority Data

Jan. 31, 2022 (JP) ................................ 2022-012632
Dec. 5, 2022 (JP) ................................ 2022-193960

(51) Int. Cl.
*H01R 12/71* (2011.01)
*H01R 13/516* (2006.01)
*H01R 13/6471* (2011.01)

(52) U.S. Cl.
CPC ......... *H01R 12/716* (2013.01); *H01R 13/516* (2013.01); *H01R 13/6471* (2013.01)

(58) Field of Classification Search
CPC ................ H01R 12/716; H01R 13/516; H01R 13/6471; H01R 12/73; H01R 13/41; H01R 12/57; H01R 12/707
See application file for complete search history.

(56) References Cited

U.S. PATENT DOCUMENTS

| | | | | | |
|---|---|---|---|---|---|
| 8,986,027 | B2 * | 3/2015 | Nishimura | H01R 43/24 439/74 |
| 2013/0012074 | A1 * | 1/2013 | Mashiyama | H01R 12/73 439/660 |
| 2015/0263464 | A1 * | 9/2015 | Arichika | H01R 12/7029 439/374 |
| 2015/0380845 | A1 * | 12/2015 | Goto | H01R 12/73 439/660 |
| 2016/0013572 | A1 * | 1/2016 | Yukutake | H01R 12/7047 439/78 |
| 2016/0064843 | A1 * | 3/2016 | Hasegawa | H01R 12/716 439/65 |

FOREIGN PATENT DOCUMENTS

| | | | |
|---|---|---|---|
| JP | 2012-046621 | A | 3/2012 |
| JP | 2021-057247 | A | 4/2021 |

* cited by examiner

*Primary Examiner* — Truc T Nguyen
(74) *Attorney, Agent, or Firm* — Studebaker Brackett PLLC

(57) ABSTRACT

In a connector, a right front corner portion of a frame portion is not covered with a ground terminal when viewed in an up and down direction, a recessed portion is provided on a top surface of the frame portion, and the connector is mounted on a circuit board such that a bottom surface of the resin body member is opposed to the circuit board. Part of the frame portion surrounding the recessed portion when viewed in the up and down direction is not present.

14 Claims, 10 Drawing Sheets

CONNECTOR

CROSS-REFERENCE TO RELATED APPLICATIONS

This application claims benefit of priority to Japanese Patent Application No. 2022-193960, filed Dec. 5, 2022, and to Japanese Patent Application No. 2022-012632, filed Jan. 31, 2022, the entire content of each is incorporated herein by reference.

BACKGROUND

Technical Field

The present disclosure relates to a connector.

Background Art

For example, a connector described in Japanese Unexamined Patent Application Publication No. 2012-046621 is known as an disclosure related to an existing connector. The connector is mounted on a substrate by solder.

Incidentally, in the connector described in Japanese Unexamined Patent Application Publication No. 2012-046621, the connector is placed in a high-temperature state at the time of being mounted on the substrate. As a result, warpage occurs in the connector. It is desired to detect such warpage of the connector in an inspection process.

SUMMARY

The present disclosure provides a connector that makes it possible to detect warpage of the connector.

For example, a connector described in Japanese Unexamined Patent Application Publication No. 2021-057247 is known as an disclosure related to an existing connector. The connector includes a shield member, a socket housing, and a plurality of socket terminal portions. When viewed in an up and down direction, the socket housing has a rectangular shape. The plurality of socket terminal portions is supported by the socket housing. The plurality of socket terminal portions is arranged in a right and left direction. A radio-frequency signal is input to and output from each of the plurality of socket terminal portions. When viewed in the up and down direction, the shield member has a rectangular shape along the outer edge of the socket housing. The shield member is connected to a ground potential.

Incidentally, it is desired to easily identify the orientation of the connector in the connector described in Japanese Unexamined Patent Application Publication No. 2021-057247.

The present disclosure provides a connector that makes it possible to easily identify the orientation of the connector.

A connector according to an aspect of the present disclosure includes a resin body member, a plurality of signal terminals supported by the resin body member, and a ground terminal supported by the resin body member. The resin body member includes a frame portion having an annular shape when viewed in an up and down direction and having a front side and a rear side extending in a right and left direction and a right side and a left side extending in a front and rear direction. The plurality of signal terminals is supported by the frame portion so as to be arranged in the right and left direction. A recessed portion is provided on a top surface of the frame portion. Part of the frame portion surrounding the recessed portion when viewed in the up and down direction is not present.

Hereinafter, a positional relationship among members in the specification will be defined. A first member to a third member are components of a connector set. In the specification, the first member and the second member arranged in a front and rear direction represent the following state. This is a state where, when the first member and the second member are viewed in a direction perpendicular to the front and rear direction, both the first member and the second member are disposed in a selected straight line representing the front and rear direction. In the specification, the first member and the second member arranged in the front and rear direction when viewed in an up and down direction represent the following state. When the first member and the second member are viewed in the up and down direction, both the first member and the second member are disposed in a selected straight line representing the front and rear direction. In this case, when the first member and the second member are viewed in a right and left direction different from the up and down direction, any one of the first member and the second member does not need to be disposed in a selected straight line representing the front and rear direction. The first member and the second member may be in contact with each other. The first member and the second member may be separated from each other. The third member may be present between the first member and the second member. This definition also applies to directions other than the front and rear direction.

In the specification, a state where the first member is disposed on or over the second member means the following state. At least part of the first member is located just on or over the second member. Therefore, when viewed in the up and down direction, the first member overlaps the second member. This definition also applies to directions other than the up and down direction.

In the specification, a state where the first member is disposed on or above the second member includes a case where at least part of the first member is located just on or over the second member and a case where the first member is not located just on or over the second member and the first member is located obliquely above the second member. In this case, when viewed in the up and down direction, the first member does not need to overlap the second member. The term “obliquely above” includes, for example, upper left and upper right. This definition also applies to directions other than the up and down direction.

In the specification, unless otherwise specified, parts of the first member are defined as follows. A front part of the first member means a front half of the first member. A rear part of the first member means a rear half of the first member. A left part of the first member means a left half of the first member. A right part of the first member means a right half of the first member. An upper part of the first member means an upper half of the first member. A lower part of the first member means a lower half of the first member. A front end of the first member means a forward end of the first member. A rear end of the first member means a rearward end of the first member. A left end of the first member means a leftward end of the first member. A right end of the first member means a rightward end of the first member. An upper end of the first member means an upward end of the first member. A lower end of the first member means a downward end of the first member. A front end part of the first member means the front end of the first member and its neighborhood. A rear end part of the first member means the rear end of the first member and its neighborhood.

A left end part of the first member means the left end of the first member and its neighborhood. A right end part of the first member means the right end of the first member and its neighborhood. An upper end part of the first member means the upper end of the first member and its neighborhood. A lower end part of the first member means the lower end of the first member and its neighborhood.

When selected two members in the specification are defined as the first member and the second member, the relationship between the selected two members means as follows. In the specification, a state where the first member is supported by the second member includes a case where the first member is attached to (that is, fixed to) the second member so as to be not movable with respect to the second member and a case where the first member is attached to the second member so as to be movable with respect to the second member. A state where the first member is supported by the second member includes both a case where the first member is directly attached to the second member and a case where the first member is attached to the second member with the third member interposed therebetween.

In the specification, a state where the first member is held by the second member includes a case where the first member is attached to (that is, fixed to) the second member so as to be not movable with respect to the second member and does not include a case where the first member is attached to the second member so as to be movable with respect to the second member. A state where the first member is held by the second member includes both a case where the first member is directly attached to the second member and a case where the first member is attached to the second member with the third member interposed therebetween.

In the specification, the phrase "the first member and the second member are electrically connected" means that the first member and the second member are electrically continuous. Therefore, the first member and the second member may be in contact with each other or the first member and the second member do not need to be in contact with each other. When the first member and the second member are not in contact with each other, the third member having electrical conductivity is disposed between the first member and the second member.

DETAILED DESCRIPTION

Figure 1:
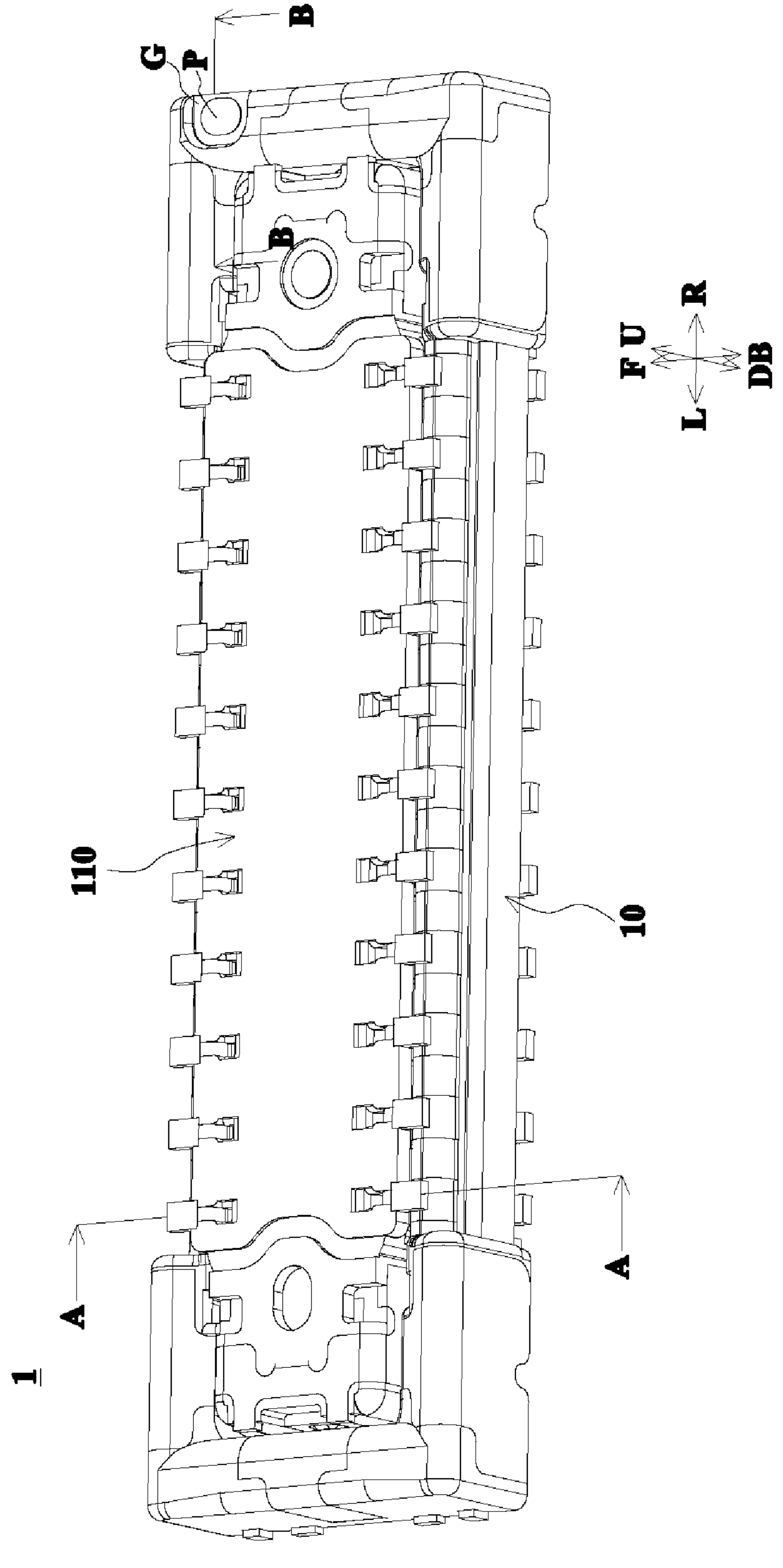
FIG. 1 is a perspective view of a connector set.

Hereinafter, a connector set 1 including a first connector 10 according to an embodiment of the present disclosure will be described. FIG. 1 is a perspective view of the connector set 1.

In the following description, as shown in FIG. 1, a direction in which a second connector 110 and the first connector 10 are arranged is defined as an up and down direction. A direction in which signal terminals 13*a* to 13*v* (see FIG. 2) are arranged in the first connector 10 is defined as a right and left direction. The right and left direction is orthogonal to the up and down direction. A direction orthogonal to the right and left direction and the up and down direction is defined as a front and rear direction. However, the up and down direction, the right and left direction, and the front and rear direction in the specification are directions defined for the sake of convenience of description and do not need to coincide with an up and down direction, a right and left direction, and a front and rear direction during use of the connector set 1. In each of the drawings, an upward direction and a downward direction may be interchanged, a rightward direction and a leftward direction may be interchanged, and a forward direction and a rearward direction may be interchanged.

The connector set 1 is, for example, used to connect two circuit boards. The connector set 1 includes the first connector 10 and the second connector 110. When the first connector 10 and the second connector 110 are connected, the second connector 110 is located on or over the first connector 10.

Structure of First Connector

Figure 2:
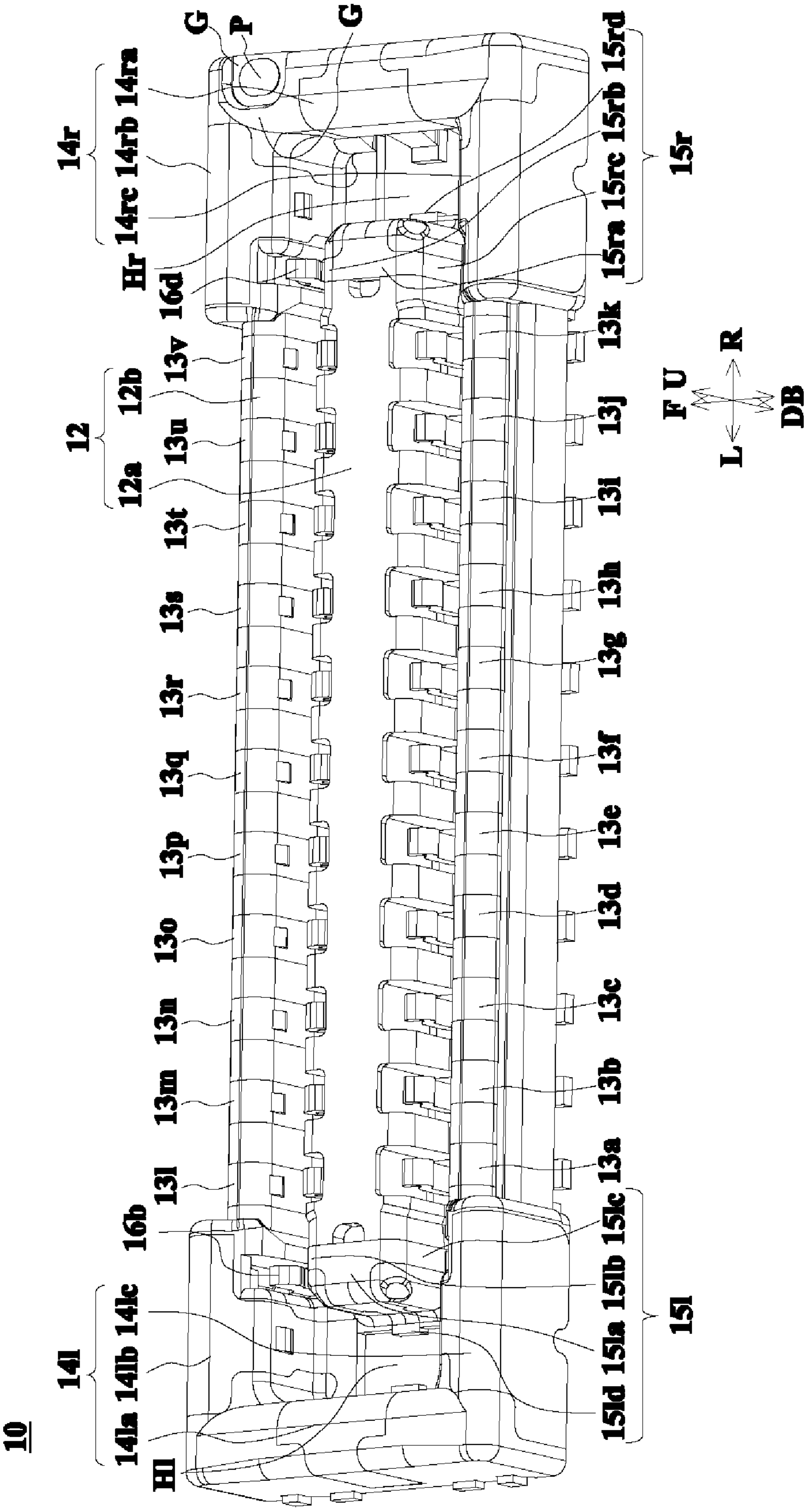
FIG. 2 is a perspective view of a first connector.
Figure 3:
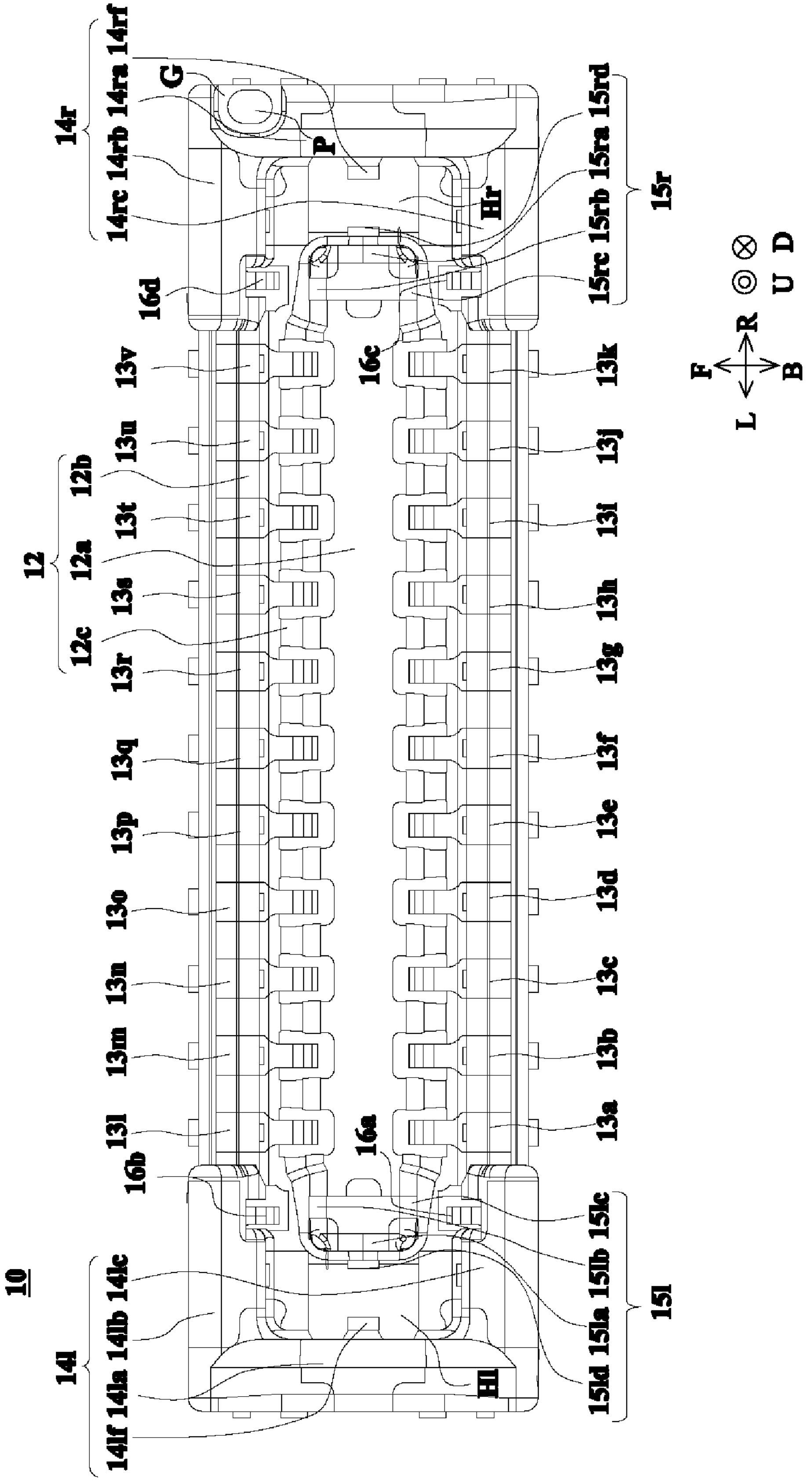
FIG. 3 is a top view of the first connector.
Figure 4:
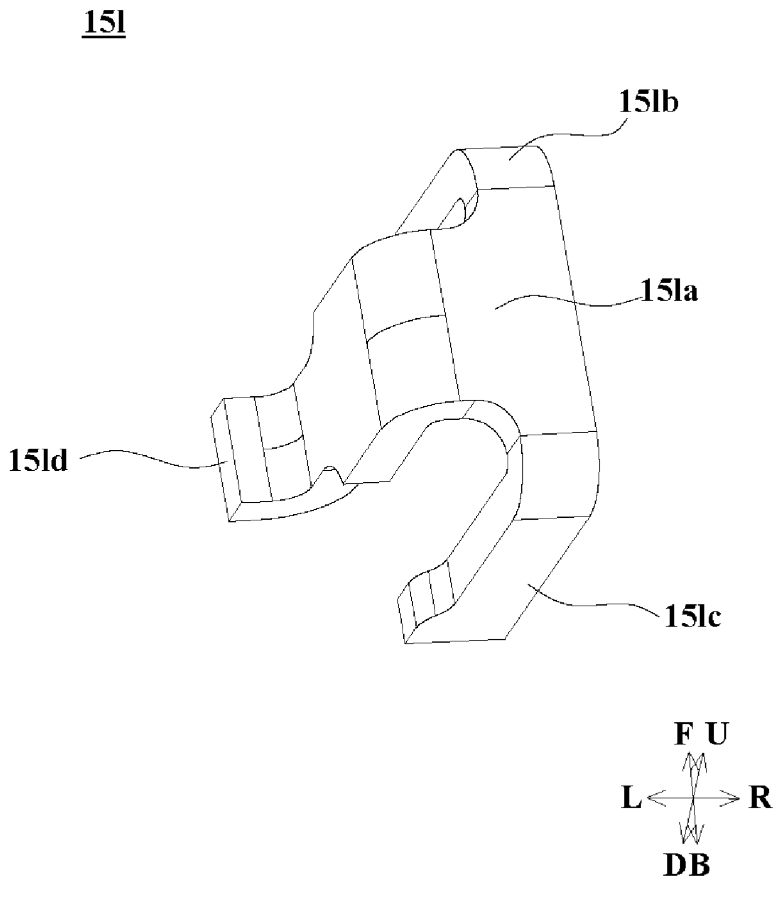
FIG. 4 is a perspective view of a floating terminal.
Figure 5:
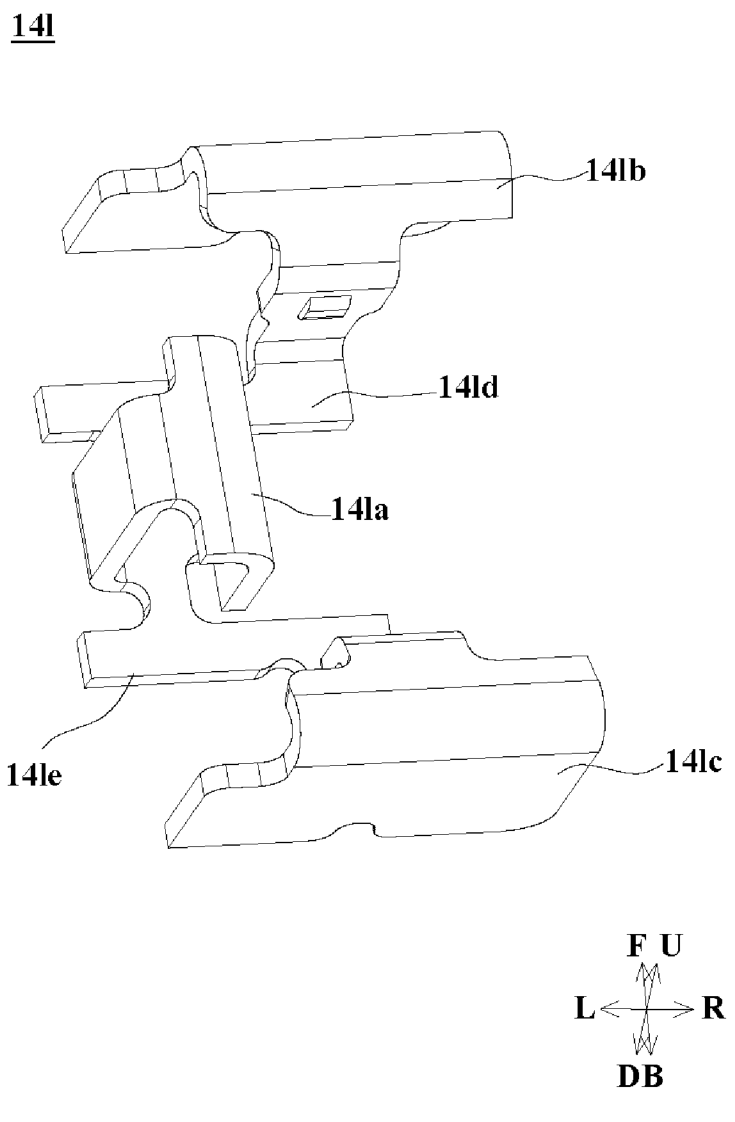
FIG. 5 is a perspective view of a ground terminal.
Figure 6:
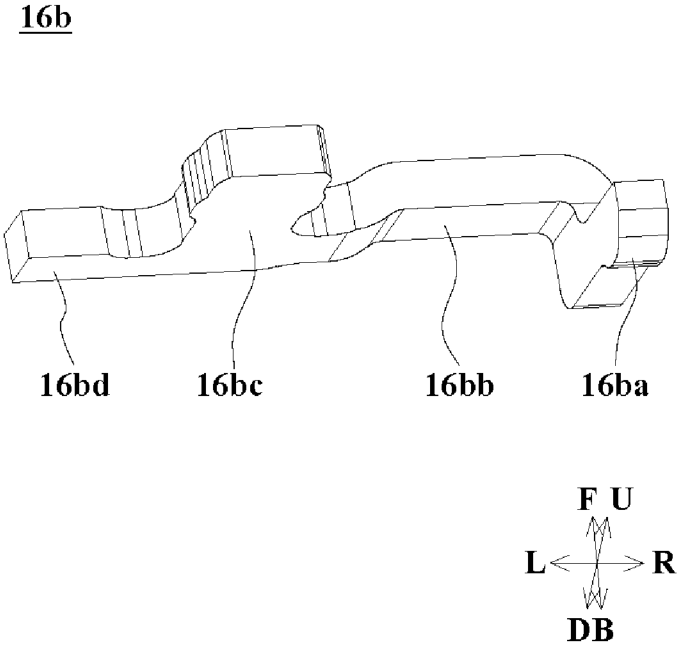
FIG. 6 is a perspective view of a ground terminal.

Next, the structure of the first connector 10 will be described. FIG. 2 is a perspective view of the first connector 10. FIG. 3 is a top view of the first connector 10. FIG. 4 is a perspective view of a floating terminal 15*l*. FIG. 5 is a perspective view of a ground terminal 14*l*. FIG. 6 is a perspective view of a ground terminal 16*b*.

As shown in FIGS. 2 and 3, the first connector 10 includes a resin body member 12, signal terminals 13*a* to 13*v*, ground terminals 14*l*, 14*r*, floating terminals 15*l*, 15*r*, and ground terminals 16*a* to 16*d*.

As shown in FIG. 2, the resin body member 12 includes a protruding portion 12*a*, a frame portion 12*b*, and a coupling portion 12*c* (see FIG. 3). When viewed in the up and down direction, the protruding portion 12*a* extends in the right and left direction. More specifically, the protruding portion 12*a* has a rectangular parallelepiped shape. When viewed in the up and down direction, the protruding portion 12*a* has two long sides extending in the right and left direction and two short sides extending in the front and rear direction.

When viewed in the up and down direction, the frame portion 12*b* has an annular shape surrounding the protruding portion 12*a*. The frame portion 12*b* has a front side and a rear side extending in the right and left direction and a right side and a left side extending in the front and rear direction. When viewed in the up and down direction, the protruding portion 12*a* is located in a region surrounded by the frame portion 12*b*. The protruding portion 12*a* is not in contact with the frame portion 12*b*.

As shown in FIG. 3, when viewed in the up and down direction, the coupling portion 12*c* is located between the protruding portion 12*a* and the frame portion 12*b* and couples the protruding portion 12*a* to the frame portion 12*b*. In the present embodiment, the coupling portion 12*c* couples the lower part of the protruding portion 12*a* to the lower part of the frame portion 12*b*. The material of the resin body member 12 is an electrically insulating material. The material of the resin body member 12 is, for example, a resin.

A radio-frequency signal is input to and output from each of the signal terminals 13*a* to 13*v*. The signal terminals 13*a* to 13*v* are supported by the resin body member 12. More specifically, part of each of the signal terminals 13$a$ to 13$k$ is embedded in the rear side of the frame portion 12$b$. Thus, the signal terminals 13$a$ to 13$k$ are supported by the frame portion 12$b$ so as to be arranged in the right and left direction in a region in back of the protruding portion 12$a$. The signal terminals 13$a$ to 13$k$ are arranged in a line in this order from the left to the right. Part of each of the signal terminals 13$l$ to 13$v$ is embedded in the front side of the frame portion 12$b$. The signal terminals 13$l$ to 13$v$ are supported by the frame portion 12$b$ so as to be arranged in the right and left direction in a region in front of the protruding portion 12$a$. The signal terminals 13$l$ to 13$v$ are respectively located in front of the signal terminals 13$a$ to 13$k$. The signal terminals 13$l$ to 13$v$ are arranged in a line in this order from the left to the right. Each of the signal terminals 13$a$ to 13$k$ is manufactured by bending a rod metal member. The material of the signal terminals 13$a$ to 13$k$ is, for example, a copper-based material, such as phosphor bronze.

The floating terminal 15$l$ is not connected to any of the terminals of the first connector 10, including the signal terminals 13$a$ to 13$v$ and the ground terminals 14$l$, 14$r$ (details will be described later). Therefore, the potential of the floating terminal 15$l$ is a floating potential. The floating terminal 15$l$ is supported by the resin body member 12. As shown in FIGS. 2 and 3, when viewed in the up and down direction, the floating terminal 15$l$ covers at least part of the left end of the protruding portion 12$a$. As shown in FIG. 4, the floating terminal 15$l$ includes a first part 15$la$, a second part 15$lb$, a third part 15$lc$, and a floating protrusion 15$ld$. The first part 15$la$ covers part of the left end of the top surface of the protruding portion 12$a$ and part of the left surface of the protruding portion 12$a$. The second part 15$lb$ extends in the forward direction from the first part 15$la$. The second part 15$lb$ covers part of the left end of the front surface of the protruding portion 12$a$. The third part 15$lc$ extends in the rearward direction from the first part 15$la$. The third part 15$lc$ covers part of the left end of the rear surface of the protruding portion 12$a$. The floating protrusion 15$ld$ extends in the leftward direction from the lower end of the first part 15$la$. The floating terminal 15$l$ is manufactured by bending a metal member. The material of the floating terminal 15$l$ is, for example, a copper-based material, such as phosphor bronze. The structure of the floating terminal 15$r$ and the structure of the floating terminal 15$l$ are bilaterally symmetrical, so the description of the structure of the floating terminal 15$r$ is omitted.

The ground terminal 14$l$ is connected to a ground potential. The ground terminal 14$l$ is supported by the resin body member 12. Specifically, the ground terminal 14$l$ is supported by the left side, the front side, and the rear side of the frame portion 12$b$. However, when viewed in the up and down direction, the left front corner portion and the left rear corner portion of the frame portion 12$b$ are not covered with the ground terminal 14$l$. The ground terminal 14$l$ is supported by the frame portion 12$b$ so as to be opposed to the floating terminal 15$l$ in the front and rear direction and in the right and left direction. Hereinafter, the structure of the ground terminal 14$l$ will be described.

As shown in FIG. 5, the ground terminal 14$l$ includes a first part 14$la$, a second part 14$lb$, a third part 14$lc$, connecting parts 14$ld$, 14$le$, and a ground protrusion 14$lf$ (see FIGS. 2 and 3). The first part 14$la$ is provided on the left surface, the top surface, and the right surface of the left side of the frame portion 12$b$. As shown in FIG. 2, part of the first part 14$la$ is embedded in the left side of the frame portion 12$b$. Thus, the first part 14$la$ is opposed to the floating terminal 15$l$ in the right and left direction. The second part 14$lb$ is provided on the front surface, the top surface, and the rear surface of the left end of the front side of the frame portion 12$b$. Part of the second part 14$lb$ is embedded in the front side of the frame portion 12$b$. Thus, the second part 14$lb$ is opposed to the floating terminal 15$l$ in the front and rear direction. The third part 14$lc$ is provided on the front surface, the top surface, and the rear surface of the left end of the rear side of the frame portion 12$b$. Part of the third part 14$lc$ is embedded in the rear side of the frame portion 12$b$. Thus, the third part 14$lc$ is opposed to the floating terminal 15$l$ in the front and rear direction.

The connecting part 14$ld$ couples the first part 14$la$ to the second part 14$lb$. The connecting part 14$le$ couples the first part 14$la$ to the third part 14$lc$. The ground protrusion 14$lf$ extends in the rightward direction from the lower end of the first part 14$la$.

The ground terminal 14$r$ is connected to a ground potential. The ground terminal 14$r$ is supported by the resin body member 12. Specifically, the ground terminal 14$r$ is supported by the right side, the front side, and the rear side of the frame portion 12$b$. However, when viewed in the up and down direction, the right front corner portion and the right rear corner portion of the frame portion 12$b$ are not covered with the ground terminal 14$r$. The ground terminal 14$r$ is supported by the frame portion 12$b$ so as to be opposed to the floating terminal 15$r$ in the front and rear direction and in the right and left direction. Hereinafter, the structure of the ground terminal 14$r$ will be described.

The ground terminal 14$r$ includes a first part 14$ra$, a second part 14$rb$, a third part 14$rc$, connecting parts 14$rd$, 14$re$, and a ground protrusion 14$rf$. The first part 14$ra$ is provided on the left surface, the top surface, and the right surface of the right side of the frame portion 12$b$. As shown in FIG. 2, part of the first part 14$ra$ is embedded in the right side of the frame portion 12$b$. Thus, the first part 14$ra$ is opposed to the floating terminal 15$r$ in the right and left direction. The second part 14$rb$ is provided on the front surface, the top surface, and the rear surface of the right end of the front side of the frame portion 12$b$. Part of the second part 14$rb$ is embedded in the front side of the frame portion 12$b$. Thus, the second part 14$rb$ is opposed to the floating terminal 15$r$ in the front and rear direction. The third part 14$rc$ is provided on the front surface, the top surface, and the rear surface of the right end of the rear side of the frame portion 12$b$. Part of the third part 14$rc$ is embedded in the rear side of the frame portion 12$b$. Thus, the third part 14$rc$ is opposed to the floating terminal 15$r$ in the front and rear direction.

The connecting part 14$rd$ couples the first part 14$ra$ to the second part 14$rb$. The connecting part 14$re$ couples the first part 14$ra$ to the third part 14$rc$. The ground protrusion 14$rf$ extends in the leftward direction from the lower end of the first part 14$ra$. Each of the ground terminals 14$l$, 14$r$ is manufactured by bending a metal member. The material of the ground terminals 14$l$, 14$r$ is, for example, a copper-based material, such as phosphor bronze.

The ground terminal 16$b$ is connected to a ground potential. The ground terminal 16$b$ is supported by the resin body member 12. In the present embodiment, the ground terminal 16$b$ is supported by the left front part of the resin body member 12. As shown in FIG. 6, the ground terminal 16$b$ includes a contact part 16$ba$, a spring part 16$bb$, a fixing part 16$bc$, and an external connecting part 16$bd$. The spring part 16$bb$, the fixing part 16$bc$, and the external connecting part 16$bd$ are arranged in this order from the right to the left. The external connecting part 16$bd$ is a part to which solder is applied when the first connector 10 is mounted on the circuit board. The fixing part 16*bc* is embedded in the resin body member 12.

The spring part 16*bb* is not supported by the resin body member 12. Therefore, the spring part 16*bb* is elastically deformable so as to deflect in the front and rear direction. The contact part 16*ba* extends in the rearward direction from the right end of the spring part 16*bb*. The ground terminal 16*b* is manufactured by bending a metal member. The material of the ground terminal 16*b* is, for example, a copper-based material, such as phosphor bronze. The structure of the ground terminal 16*a* and the structure of the ground terminal 16*b* are symmetrical in the front and back, so the description of the structure of the ground terminal 16*a* is omitted. The structure of the ground terminal 16*d* and the structure of the ground terminal 16*b* are bilaterally symmetrical, so the description of the structure of the ground terminal 16*d* is omitted. The structure of the ground terminal 16*c* and the structure of the ground terminal 16*a* are bilaterally symmetrical, so the description of the structure of the ground terminal 16*c* is omitted.

As shown in FIG. 3, in the first connector 10 as described above, when viewed in the up and down direction, a through-hole Hl extending through the coupling portion 12*c* in the up and down direction is provided in at least part of a region between the first part 14*la* and the floating terminal 15*l*. When viewed in the up and down direction, the ground protrusion 14*lf* protrudes into the through-hole Hl. When viewed in the up and down direction, the floating protrusion 15*ld* protrudes into the through-hole Hl. The ground protrusion 14*lf* and the floating protrusion 15*ld* are arranged in the right and left direction. The structure of a through-hole Hr and the structure of the through-hole Hl are bilaterally symmetrical, so the description of the structure of the through-hole Hr is omitted.

Figure 9:
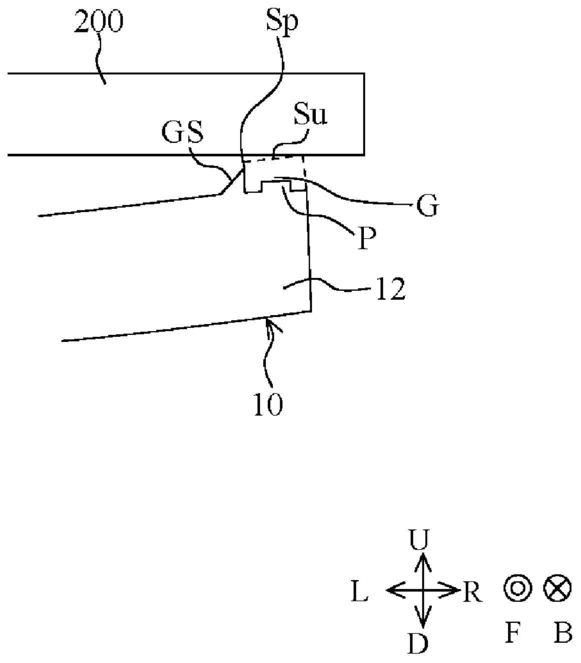
FIG. 9 is a cross-sectional view of the first connector and the second connector.

In the first connector 10, a recessed portion G is provided on the top surface of the right front corner portion of the frame portion 12*b*. The recessed portion G is recessed in a downward direction from the top surface of the front right corner portion of the frame portion 12*b*. However, the inner peripheral surface of the recessed portion G connects with the right surface of the right side of the frame portion 12*b*. In other words, part of the frame portion 12*b* surrounding the recessed portion G when viewed in the up and down direction is not present. Therefore, when viewed in the up and down direction, part of the recessed portion G has an open part. Thus, the inside of the recessed portion G is visually recognizable when viewed in the front and rear direction or in the right and left direction. In the present embodiment, the frame portion 12*b* is not present to the right of the recessed portion G. Thus, when viewed in the leftward direction, the inner peripheral surface of the recessed portion G is visually recognizable. A visually recognizable state includes a state of detectable with a camera, an optical sensor, or the like. When viewed in the up and down direction, the frame portion 12 has an inner edge and an outer edge. As shown in FIGS. 1 and 9, part of the inner edge of the frame portion 12, located closest to the recessed portion G, has a guide surface GS facing in an obliquely upward direction. In addition, a protrusion P that protrudes in an upward direction is provided on the bottom surface of the recessed portion G. The upper end of the protrusion P is located below the upper end of the top surface of the frame portion 12*b*. Therefore, the protrusion P does not protrude in the upward direction from the top surface of the frame portion 12*b*.

In the above first connector 10, the first connector 10 is mounted on a first circuit board (not shown) such that the bottom surface of the resin body member 12 is opposed to the first circuit board. Specifically, parts of the signal terminals 13*a* to 13*v*, ground terminals 14*l*, 14*r*, floating terminals 15*l*, 15*r*, and ground terminals 16*a* to 16*d* are exposed from the bottom surface of the resin body member 12. Solder is applied to each of these parts. Thus, the signal terminals 13*a* to 13*v*, the ground terminals 14*l*, 14*r*, the floating terminals 15*l*, 15*r*, and the ground terminals 16*a* to 16*d* are respectively connected to the electrodes of the first circuit board.

Structure of Second Connector

Figure 7:
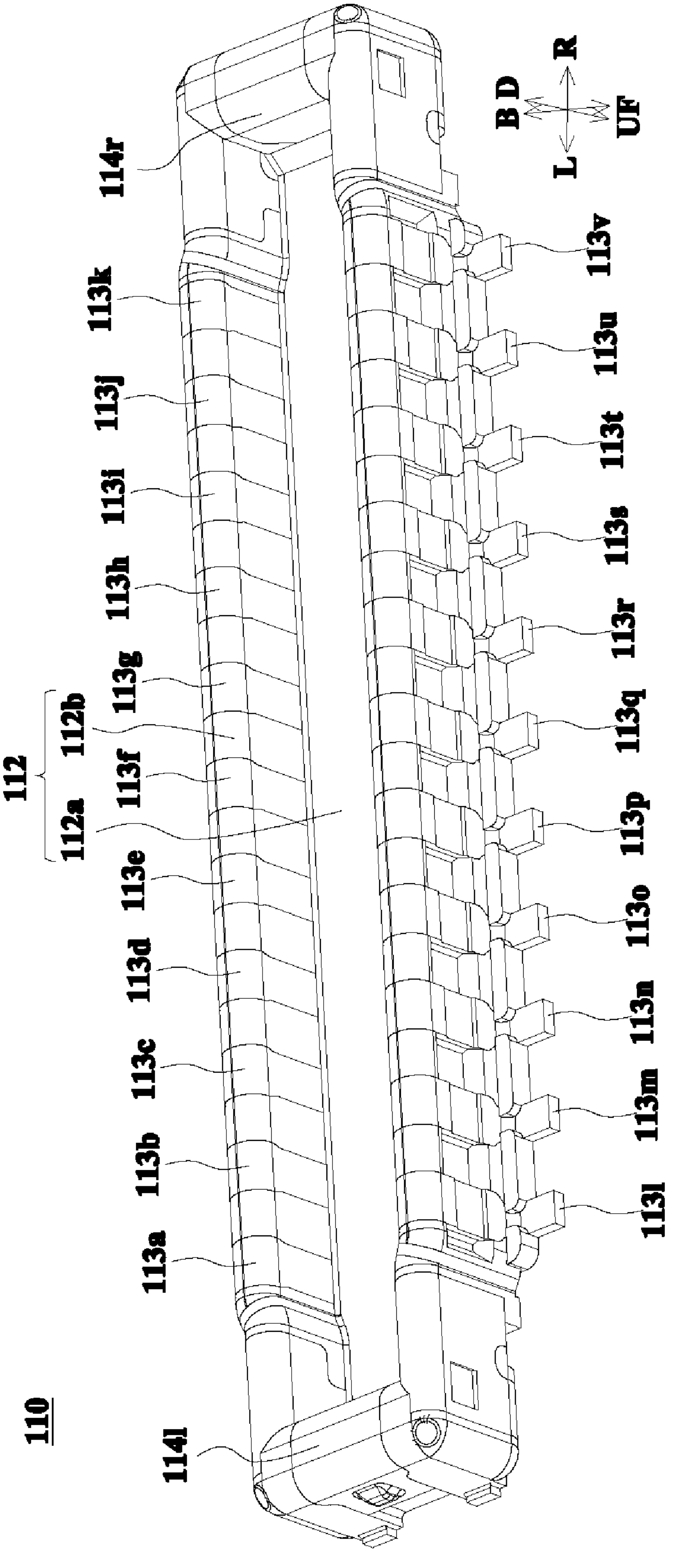
FIG. 7 is a perspective view of a second connector.

Next, the structure of the second connector 110 will be described. FIG. 7 is a perspective view of the second connector 110. FIG. 7 is a perspective view of the second connector 110.

As shown in FIG. 7, the second connector 110 includes a resin body member 112, signal terminals 113*a* to 113*v*, and ground terminals 114*l*, 114*r*.

The resin body member 112 includes a bottom portion 112*a* and a frame portion 112*b*. When viewed in the up and down direction, the frame portion 112*b* has an annular shape. More specifically, when viewed in the up and down direction, the frame portion 112*b* has a rectangular outer edge and a rectangular inner edge. When viewed in the up and down direction, each of the outer edge of the frame portion 112*b* and the inner edge of the frame portion 112*b* has two long sides extending in the right and left direction and two short sides extending in the front and rear direction. As shown in FIG. 7, when viewed in the up and down direction, the bottom portion 112*a* closes the top surface of a region surrounded by the frame portion 112*b*. The material of the resin body member 112 is an electrically insulating material. The material of the resin body member 112 is, for example, a resin.

A radio-frequency signal is input to and output from each of the signal terminals 113*a* to 113*v*. The signal terminals 113*a* to 113*v* are supported by the resin body member 112. More specifically, part of each of the signal terminals 113*a* to 113*k* is embedded in the rear side of the frame portion 112*b*. The signal terminals 113*a* to 113*k* are arranged in a line in this order from the left to the right. Part of each of the signal terminals 113*l* to 113*v* is embedded in the front side of the frame portion 112*b*. The signal terminals 113*l* to 113*v* are respectively located in front of the signal terminals 113*a* to 113*k*. The signal terminals 113*l* to 113*v* are arranged in a line in this order from the left to the right. Each of the signal terminals 113*a* to 113*k* is manufactured by bending a rod metal member. The material of the signal terminals 113*a* to 113*k* is, for example, a copper-based material, such as phosphor bronze.

The ground terminal 114*l* is connected to a ground potential. The ground terminal 114*l* is supported by the resin body member 112. Part of the ground terminal 114*l* is embedded in the left end of the front side of the frame portion 112*b*, the left end of the rear side of the frame portion 112*b*, and the left side of the frame portion 112*b*. The ground terminal 114*l* is manufactured by bending a metal member. The material of the ground terminal 114*l* is, for example, a copper-based material, such as phosphor bronze. The structure of the ground terminal 114*r* and the structure of the ground terminal 114*l* are bilaterally symmetrical, so the description of the structure of the ground terminal 114*r* is omitted.

In the above second connector 110, the second connector 110 is mounted on a second circuit board (not shown) such that the bottom surface of the resin body member 112 is opposed to the circuit board. Specifically, parts of the signal terminals 113*a* to 113*v* and ground terminals 114*l*, 114*r* are exposed from the bottom surface of the resin body member 112. Solder is applied to each of these parts. Thus, the signal terminals 113*a* to 113*v* and the ground terminals 114*l*, 114*r* are respectively connected to the electrodes of the second circuit board.

Structure of Connector Set

Figure 8:
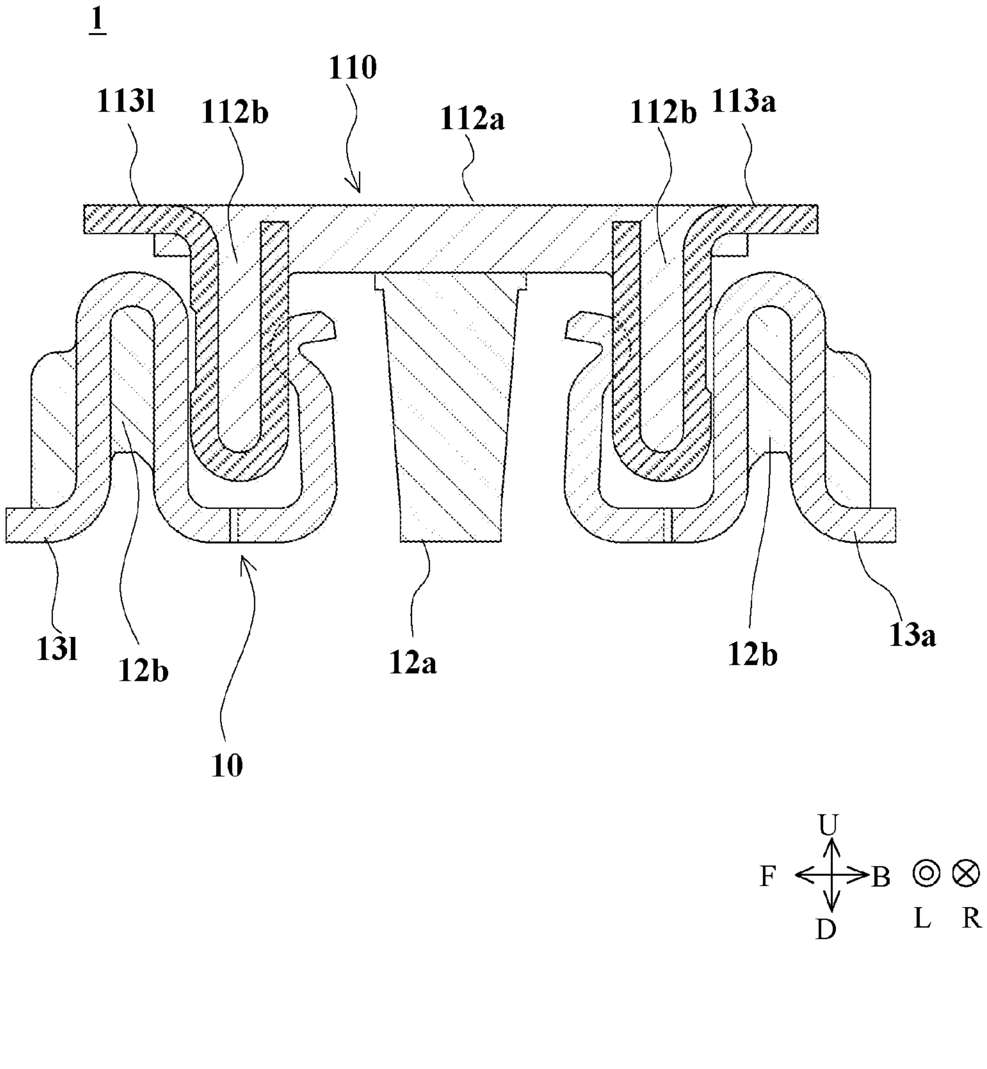
FIG. 8 is a cross-sectional view taken along the line A-A in FIG. 1.

Next, the structure of the connector set 1 will be described. FIG. 8 is a cross-sectional view taken along the line A-A in FIG. 1.

As shown in FIGS. 1 and 8, the frame portion 112*b* of the second connector 110 is inserted in a region surrounded by the frame portion 12*b* of the first connector 10. At this time, the protruding portion 12*a* of the first connector 10 is inserted in a region surrounded by the frame portion 112*b* of the second connector 110. Thus, the signal terminals 13*a* to 13*v* respectively contact with the signal terminals 113*a* to 113*v*. The ground terminals 14*l*, 14*r* respectively contact with the ground terminals 114*l*, 114*r*. Furthermore, the ground terminals 16*a*, 16*b* contact with the ground terminal 114*l*. The ground terminals 16*c*, 16*d* contact with the ground terminal 114*r*.

However, the floating terminals 15*l*, 15*r* do not contact with the signal terminals 113*a* to 113*v* or the ground terminals 114*l*, 114*r*. Thus, in a state where the second connector 110 is connected to the first connector 10 as well, the potential of each of the floating terminals 15*l*, 15*r* remains at a floating potential.

Advantageous Effects

With the first connector 10, the first connector 10 can be used in a high frequency band. More specifically, when a large capacitance is formed between the ground terminal 14*r* and the signal terminals 13*a* to 13*v*, a resonant frequency that is generated in the first connector 10 tends to increase. Therefore, the resonant frequency that is generated in the first connector 10 tends to approach the frequency band of a radio-frequency signal that is input to or output from each of the signal terminals 13*a* to 13*v*. As a result, in the first connector 10, an insertion loss can occur.

For this reason, in the first connector 10, the front right corner portion and rear right corner portion of the frame portion 12*b* are not covered with the ground terminal 14*r* when viewed in the up and down direction. Thus, the first connector 10 can be used in a high frequency band without significantly decreasing the reliability of connection between the ground terminal 14*r* and the ground terminal 114*r*. More specifically, the ground terminal 114*r* contacts with the first part 14*ra* so as to push the left surface of the first part 14*ra* in a rightward direction, contacts with the second part 14*rb* so as to push the rear surface of the second part 14*rb* in a forward direction, and contacts with the third part 14*rc* so as to push the front surface of the third part 14*rc* in a rearward direction. In other words, the ground terminal 114*r* contacts from the inside of the ground terminal 14*r*. In this case, the ground terminal 14*r* is difficult to contact with the front right corner portion and the rear right corner portion of the frame portion 12*b*. In this case, even when the front right corner portion and the rear right corner portion of the frame portion 12*b* are not covered with the ground terminal 14*r* when viewed in the up and down direction, the reliability of connection between the ground terminal 14*r* and the ground terminal 114*r* is less likely to significantly decrease. For this reason, when viewed in the up and down direction, the right front corner portion and the right rear corner portion of the frame portion 12*b* are not covered with the ground terminal 14*r*. Thus, an area in which the ground terminal 14*r* and the signal terminals 13*a* to 13*v* are opposed to each other reduces. Thus, a capacitance that is formed between the ground terminal 14*r* and the signal terminals 13*a* to 13*v* reduces, so a resonant frequency that is generated in the first connector 10 tends to increase. Thus, with the first connector 10, the first connector 10 can be used in a high frequency band.

With the first connector 10, the warpage of the second connector 110 can be detected. FIG. 9 is a cross-sectional view of the first connector 10 and the second connector 110. FIG. 9 is a cross-sectional view taken along the line B-B in FIG. 1. In FIG. 9, the second connector 110 is mounted on the circuit board 200.

In the first connector 10, part of the frame portion 12*b* surrounding the recessed portion G when viewed in the up and down direction is not present. Thus, the inside of the recessed portion G is visually recognizable when viewed in the front and rear direction or in the right and left direction. Thus, as shown in FIG. 9, when warpage occurs in the first connector 10, formation of a space Sp between the circuit board 200 and a top surface Su of the frame portion 12*b* can be found through the recessed portion G. As a result, with the first connector 10, the warpage of the first connector 10 can be detected. According to a similar principle, with the first connector 10, the warpage of the second connector 110 can be detected.

With the first connector 10, the orientation of the first connector 10 is easily identified. More specifically, for this reason, in the first connector 10, the front right corner portion and rear right corner portion of the frame portion 12*b* are not covered with the ground terminal 14*r* when viewed in the up and down direction. Then, the recessed portion G is provided on the top surface of the front right corner portion of the frame portion 12*b*. Thus, the orientation of the first connector 10 is easily identified in accordance with the location of the recessed portion G. As described above, with the first connector 10, the first connector 10 can be used in a high frequency band without significantly decreasing the reliability of connection between the ground terminal 14*r* and the ground terminal 114*r*, and the orientation of the first connector 10 is easily identified.

With the first connector 10, it is possible to easily remove the first connector 10 from the second connector 110. More specifically, the second circuit board is mounted on the top surface of the resin body member 112 of the second connector 110. The second circuit board is opposed to the top surface of the frame portion 12*b*. In the first connector 10, the recessed portion G is provided on the top surface of the right front corner portion of the frame portion 12*b*. Thus, by inserting a jig into the recessed portion G, a force to separate the frame portion 12*b* and the second circuit board from each other is generated. As a result, with the first connector 10, it is possible to easily remove the first connector 10 from the second connector 110.

In the first connector 10, the recessed portion G is provided on the top surface of the right front corner portion of the frame portion 12*b*. Thus, it is possible to visually check the state of connection between the first connector 10 and the second connector 110 through the recessed portion G.

With the first connector 10, the size of the first connector 10 is reduced. More specifically, in the first connector 10, generally, an insertion molded gate can be formed on the bottom surface of the resin body member 12. However, when the size of the first connector 10 is reduced, the percentage of terminal portions on the bottom surface of the resin body member 12 increases. The terminal portions are portions where solder is applied to the signal terminals 13*a* to 13*v*, the ground terminals 14*l*, 14*r*, and the floating terminals 15*l*, 15*r*. As a result, it is difficult to ensure space for forming a gate on the bottom surface of the resin body member 12.

On the other hand, no first circuit board is mounted on the top surface of the resin body member 12. In addition, in the first connector 10, the front right corner portion and rear right corner portion of the frame portion 12*b* are not covered with the ground terminal 14*r* when viewed in the up and down direction. Therefore, it is easy to ensure space for forming a gate on the top surface of the resin body member 12. In the first connector 10, the recessed portion G is provided on the top surface of the right front corner portion of the frame portion 12*b*. The protrusion P that protrudes in the upward direction is provided on the bottom surface of the recessed portion G. The protrusion P is a gate. Thus, with the first connector 10, the size of the first connector 10 is reduced.

In the first connector 10, the upper end of the protrusion P is located below the upper end of the top surface of the frame portion 12*b*. Thus, contact of the protrusion P with the second connector 110 is suppressed. As a result, it is possible to suppress a decrease in the reliability of connection between the ground terminal 14*r* and the ground terminal 114*r*.

In the first connector 10, as shown in FIGS. 1 and 9, part of the inner edge of the frame portion 12, located closest to the recessed portion G, has a guide surface GS facing in an obliquely upward direction. Thus, the space Sp increases, so a detection of the space Sp is easy. As a result, with the first connector 10, it is easy to detect the warpage of the first connector 10 or the second connector 110.

Modification

Figure 10:
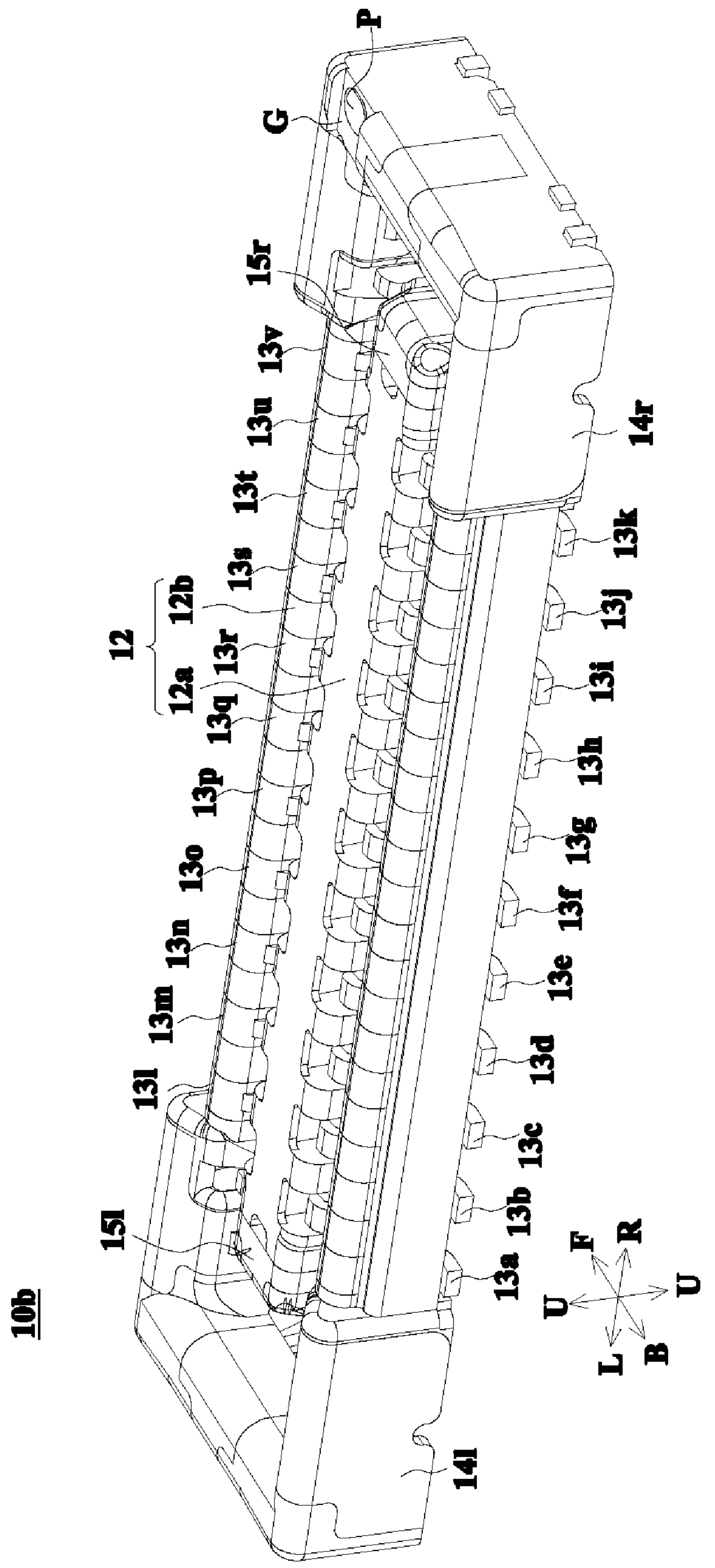
FIG. 10 is a perspective view of a first connector according to a modification.

Hereinafter, the structure of a first connector 10*a* according to a modification will be described. FIG. 10 is a perspective view of the first connector 10*a*.

The first connector 10*a* differs from the first connector 10 in the shape of the recessed portion G. The recessed portion G is a groove that connects the left surface of the right side of the frame portion 12*b* with the right surface of the right side of the frame portion 12*b*. The other structure of the first connector 10*a* is the same as that of the first connector 10, so the description is omitted. The first connector 10*a* provides the same operation and advantageous effects as the first connector 10.

Thus, in the first connector 10*a*, when warpage occurs in the first connector 10*a*, a space is formed between the circuit board 200 and the top surface of the frame portion 12*b*, so light passing through the recessed portion G increases. As a result, with the first connector 10*a*, the warpage of the first connector 10*a* can be detected. According to a similar principle, with the first connector 10*a*, the warpage of the second connector 110 can be detected.

In the first connector 10*a*, the recessed portion G is a groove that connects the left surface of the right side of the frame portion 12*b* with the right surface of the right side of the frame portion 12*b*. Therefore, it is possible to visually check the region surrounded by the frame portion 12*b* through the recessed portion G. As a result, it is possible to further reliably visually check the state of connection between the first connector 10 and the second connector 110 through the recessed portion G.

Other Embodiments

The connector according to the present disclosure is not limited to the first connector 10 and may be changed within the scope of the purport of the present disclosure.

The ground terminals 14*l*, 16*a* to 16*d*, and the floating terminals 15*l*, 15*r* are not indispensable components.

In the specification, the annular shape is not limited to a complete ring and includes a partially cut-out ring. However, in the annular shape, the ratio of the cut-out part to the ring is lower than or equal to 20%.

The through-holes Hl, Hr do not need to be provided.

The ground protrusions 14*lf*, 14*rf* and the floating protrusions 15*ld*, 15*rd* are not indispensable components.

The floating terminals 15*l*, 15*r* may be connected to the electrodes of the circuit board or may be configured not to be connected to the electrodes of the circuit board.

The first connector 10 may include any one of the set of signal terminals 13*a* to 13*k* and the set of signal terminals 13*l* to 13*v*.

The recessed portion G may be provided at a portion other than the front right corner portion of the frame portion 12*b*.

What is claimed is:

1. A connector comprising:
- a resin body member;
- a plurality of signal terminals supported by the resin body member; and
- a ground terminal supported by the resin body member, wherein
- the resin body member includes a frame portion having an annular shape when viewed in an up and down direction, the frame portion having a front side and a rear side extending in a right and left direction and a right side and a left side extending in a front and rear direction,
- the plurality of signal terminals is supported by the frame portion and arranged in the right and left direction,
- a recessed portion is on a top surface of the frame portion, and
- an inner peripheral surface of the recessed portion connects with and extends to an outside surface of one of the sides of the frame portion, such that the inner peripheral surface of the recessed portion is visible when viewed in a direction of the one of the sides of the frame portion.

2. The connector according to claim 1, wherein
- the resin body member includes
  - a protruding portion; and
  - a coupling portion,
- when viewed in the up and down direction, the protruding portion extends in the right and left direction,
- the frame portion having an annular shape surrounding the protruding portion when viewed in the up and down direction,
- the coupling portion is between the protruding portion and the frame portion when viewed in the up and down direction, the coupling portion coupling the protruding portion to the frame portion, and
- the plurality of signal terminals is supported by the frame portion and arranged in the right and left direction in a region in front of or in back of the protruding portion.

3. The connector according to claim 2, wherein
- the ground terminal is supported by the right side and the left side of the frame portion, a right front corner portion of the frame portion is not covered with the ground terminal when viewed in the up and down direction, the recessed portion is on a top surface of the right front corner portion of the frame portion, and the connector is mounted on a circuit board such that a bottom surface of the resin body member is opposed to the circuit board.

4. The connector according to claim 1, wherein a protrusion that protrudes in an upward direction is on a bottom surface of the recessed portion, and an upper end of the protrusion is located below an upper end of the top surface of the frame portion.

5. The connector according to claim 3, wherein the recessed portion is a groove that connects a left surface of the right side of the frame portion with a right surface of the right side of the frame portion.

6. The connector according to claim 1, wherein when viewed in the up and down direction, the frame portion has an inner edge and an outer edge, and a guide surface facing in an obliquely upward direction is at a part of the inner edge, located closest to the recessed portion.

7. The connector according to claim 2, wherein a protrusion that protrudes in an upward direction is on a bottom surface of the recessed portion, and an upper end of the protrusion is located below an upper end of the top surface of the frame portion.

8. The connector according to claim 3, wherein a protrusion that protrudes in an upward direction is on a bottom surface of the recessed portion, and an upper end of the protrusion is located below an upper end of the top surface of the frame portion.

9. The connector according to claim 2, wherein when viewed in the up and down direction, the frame portion has an inner edge and an outer edge, and a guide surface facing in an obliquely upward direction is at a part of the inner edge, located closest to the recessed portion.

10. The connector according to claim 3, wherein when viewed in the up and down direction, the frame portion has an inner edge and an outer edge, and a guide surface facing in an obliquely upward direction is at a part of the inner edge, located closest to the recessed portion.

11. The connector according to claim 4, wherein when viewed in the up and down direction, the frame portion has an inner edge and an outer edge, and a guide surface facing in an obliquely upward direction is at a part of the inner edge, located closest to the recessed portion.

12. The connector according to claim 5, wherein when viewed in the up and down direction, the frame portion has an inner edge and an outer edge, and a guide surface facing in an obliquely upward direction is at a part of the inner edge, located closest to the recessed portion.

13. The connector according to claim 7, wherein when viewed in the up and down direction, the frame portion has an inner edge and an outer edge, and a guide surface facing in an obliquely upward direction is at a part of the inner edge, located closest to the recessed portion.

14. The connector according to claim 8, wherein when viewed in the up and down direction, the frame portion has an inner edge and an outer edge, and a guide surface facing in an obliquely upward direction is at a part of the inner edge, located closest to the recessed portion.

* * * * *